United States Patent [19]

Simons

[11] 4,234,757
[45] Nov. 18, 1980

[54] ELECTRICAL CABLE ACCESSORIES CONFIGURED FOR LUBRICATED INSTALLATION

[75] Inventor: Craig W. Simons, Hackettstown, N.J.

[73] Assignee: Amerace Corporation, New York, N.Y.

[21] Appl. No.: 911,158

[22] Filed: May 31, 1978

[51] Int. Cl.³ .......................................... H02G 15/064
[52] U.S. Cl. ...................................... 174/73 R; 174/80
[58] Field of Search .............. 174/73 R, 73 SC, 75 D, 174/80

[56] References Cited

U.S. PATENT DOCUMENTS

| | | | |
|---|---|---|---|
| 3,787,796 | 1/1974 | Barr | 339/60 R |
| 3,878,313 | 4/1975 | Varner et al. | 174/73 R X |
| 3,880,487 | 4/1975 | Goodman et al. | 339/60 R |
| 4,054,743 | 10/1977 | Mayer et al. | 174/73 R X |

FOREIGN PATENT DOCUMENTS 1400928 4/1965 France .................................... 174/73 R Primary Examiner—B. A. Reynolds
Assistant Examiner—E. F. Borchelt
Attorney, Agent, or Firm—Arthur Jacob; Ken Richardson

[57] ABSTRACT

An electrical cable accessory, such as a terminator or an electrical connector element, to be installed at the terminus of a shielded electrical cable using a lubricant to ease the installation has an opening for receiving the cable and a flared inlet passage through which the cable terminus passes, the configuration of the inlet passage permitting the lubricant to enter the opening during installation and assuring that the cable will be gripped appropriately within the opening upon completion of the installation.

18 Claims, 4 Drawing Figures

ELECTRICAL CABLE ACCESSORIES CONFIGURED FOR LUBRICATED INSTALLATION

The present invention relates generally to the installation of electrical cable accessories such as terminators and electrical connector elements, upon electrical cables in power distribution systems, and pertains, more specifically, to configurations which enable such accessories to be installed with greater ease than attained heretofore.

In recent years, heavy emphasis has been placed upon the development of underground electrical power distribution systems, especially in light industrial, commercial and residential areas. Various power distribution components, such as electrical cables, transformers and cable accessories, including terminators and electrical connectors, have been evolved for use in such systems.

Among these components, cable accessories, such as terminators and electrical connectors, have been developed which are installed in the field at the terminal ends of electrical cables so as to facilitate the construction and installation of underground power distribution systems. For the most part, these cable accessories or devices are fitted over the cable ends, or the component parts of the accessory are fitted together, in an interference fit between a generally tubular member of elastomeric material and a cylindrical surface over which the tubular member is placed. The appropriate interference fit will establish a gripping force between the interfitted elements suitable for attaining and maintaining both the mechanical and electrical integrity of the assembly.

Lubricants have been used to ease the frictional forces developed during installation and to aid in the proper placement of a cable accessory upon a cable. Typically, a lubricant will be spread upon the cable surface, as well as being placed within the opening provided in the accessory for the cable, prior to insertion of the cable within the opening. However, the configurations of the openings in the accessories were such that a major portion of the lubricant was wiped from the cable surface as the cable entered the opening, thereby defeating, to a large extent, the ability of the lubricant to ease the insertion.

It is therefore an object of the present invention to provide electrical cable accessories having a configuration for facilitating lubricated installation of the accessories upon cables.

Another object of the invention is to provide electrical cable accessories, such as terminators and electrical connector elements, having an opening for receiving the cable and a flared inlet passage through which the cable passes, the configuration of the inlet passage permitting lubricant to enter the opening during installation to ease the installation.

Still another object of the invention is to provide electrical cable accessories with a flared inlet passage as described above and which assures that the cable will be gripped appropriately within the opening of the accessory upon completion of the installation.

Yet another object of the invention is to provide electrical cable accessories with a flared inlet passage as described above and which will accept cables having an outside diameter which falls within a predetermined range of diameters while assuring ease of installation and an appropriate assembled relationship between the cable and the accessory.

A further object of the invention is to render practical the fabrication of electrical cable accessories for installation or assembly in the field on cables of larger diameter by virtue of making available eased lubricated assembly or installation.

A still further object of the invention is to provide electrical cable accessories having a construction which does not depart radically from the presently accepted construction of accessories of the same type, but which incorporate configurations for facilitating lubricated installation or assembly of the accessories upon a cable, particularly in the field.

The above objects, as well as still further objects and advantages are attained by the present invention, which may be described briefly as providing, in a cable accessory to be installed at the terminus of an electrical cable by using a lubricant to ease the installation, the cable having an outside diameter falling within a predetermined range between a smallest diameter and a largest diameter, the cable including a conductor, insulation surrounding the conductor, and a conductive shield surrounding the insulation: a sleeve-like member of elastomeric material having an open end through which the terminus of the cable is to be passed and an axially extending opening for receiving the cable terminus, the opening including a resiliently dilatable insulation-gripping portion for firmly gripping the insulation and an inlet passage extending between the insulation-gripping portion and the open end of the sleeve-like member; the inlet passage being flared radially outwardly in the direction from the insulation-gripping portion toward the open end such that the inside diameter of the inlet passage at the open end is substantially larger than the largest diameter of the predetermined range, the inlet passage including a first axially-extending portion tapering downwardly from a maximum diameter at the open end to a first prescribed diameter spaced axially from the open end, and a second axially-extending portion tapering downwardly from the first prescribed diameter to a second prescribed diameter located adjacent the insulation-gripping portion of the opening; the inside diameter of the inlet passage at the open end being large enough to permit the lubricant on the cable to enter the opening during installation, and the first and second prescribed diameters being such that the relative dimensions of the second axially-extending portion of the inlet passage and a cable having an outside diameter within the predetermined range will assure that the cable will be gripped firmly at a location along the second axially-extending portion of the inlet passage.

The invention will be more fully understood, while still further objects and advantages will become apparent, in the following detailed description of embodiments thereof illustrated in the accompanying drawing, in which.

Figure 1:
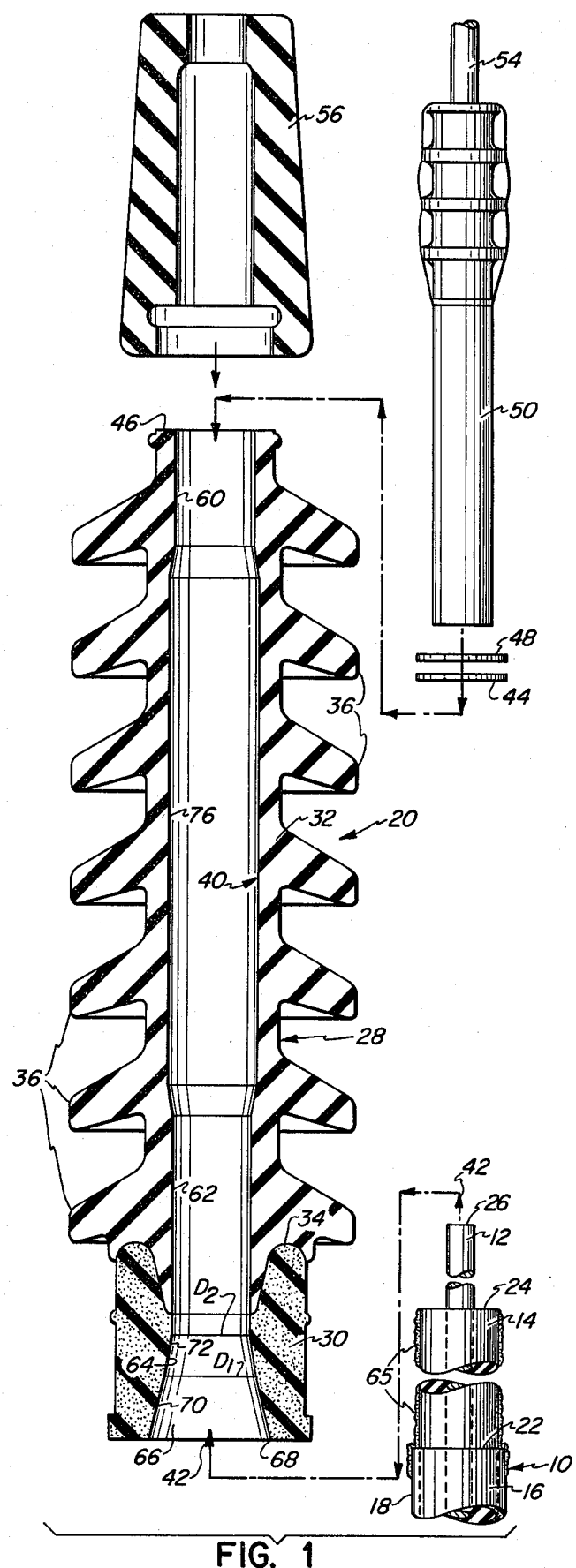
FIG. 1 is an exploded, longitudinal cross-sectional view of a terminator constructed in accordance with the invention and about to be installed upon a cable terminus.
Figure 2:
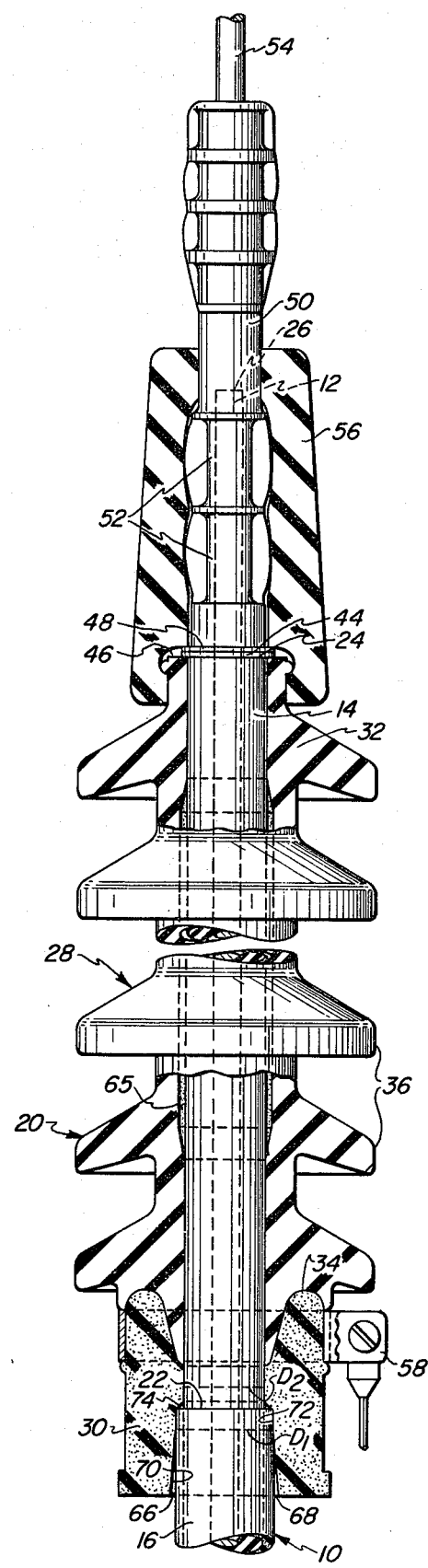
FIG. 2 is an elevational view of the terminator of FIG. 1, assembled on the cable terminus, with portions cut away to reveal details of the assembly.

Referring now to the drawing, and especially to FIGS. 1 and 2 thereof, an electrical cable 10 is seen to have a central conductor 12 surrounded by insulation 14 which, in turn, is surrounded by a conductive shield 16. The outside surface 18 of the cable 10 has an overall diameter which falls within a predetermined range between a smallest diameter and a largest diameter, the range constituting the cable diameter variation to be accomodated by a particular cable accessory constructed in accordance with the invention.

A cable accessory in the form of a terminator 20, constructed in accordance with the invention, is to be installed at the terminus of cable 10, which is prepared for the installation by removing a length of the shield 16 to expose the insulation 14 beyond the terminal end 22 of the shield 16, and removing lengths of the shield 16 and the insulation 14 to expose the conductor 12 beyond the terminal end 24 of the insulation 14, conductor 12 terminating at a terminal end 26. Terminator 20 includes a sleeve-like member in the form of a housing 28 of elastomeric material having an essentially solid elastomeric composite construction including a first part 30 of conductive elastomeric material and a second part 32 of insulating elastomeric material molded integral with the first part 30. The configuration of the boundary 34 between the first and second parts 30 and 32 provides the proper electrical stress relief for terminating cable 10. A plurality of annular ribs 36 establish the appropriate increase in the length of the creep path along the insulation of the housing 28.

Housing 28 has an opening in the form of a central bore 40 extending axially through the entire longitudinal length of the housing for receiving the terminus of cable 10. The installation is carried out by inserting the terminus of cable 10 into the central bore 40 of housing 28, in the direction indicated by arrowheads 42 in FIG. 1, and continuing the advancement of the cable 10 within the housing 28 until the housing 28 is properly located relative to the cable terminus, as illustrated in FIG. 2. When the housing 28 is so located upon the cable 10, an annular retainer 44 is slipped over the conductor 12 and placed against the terminal end 24 of insulation 14, the retainer 44 extending radially outwardly beyond bore 40 along the upper end 46 of the element housing 28. A terminal connector 50 is then placed over and affixed to the bared length of conductor 12, as by crimping at 52, the terminal connector element including a universal rod connector 54 projecting upwardly for connection within a power distribution system. The retainer 44 thus is captured in place and, in turn, secures the cable 10 against retraction from the housing 28. A selected number of spacers, such as spacer 48, are inserted between retainer 44 and terminal connector 50 to secure cable 10 against such retraction. A cap 56 of molded elastomeric material is fitted over the upper end 46 and over connector element 50 with an interference fit to provide a waterseal, and a ground strap 58 is affixed to the conductive first part 30 of housing 28, thereby completing the installation.

The relative dimensions of bore 40 and cable 10 are such that portions of the bore will be resiliently dilated to grip corresponding portions of the cable with sufficient gripping force to provide the appropriate waterseals, dielectric integrity where necessary, electrical connection where required, and general mechanical integrity as desired. Thus, at least portions 60 and 62 of bore 40 have an internal diameter somewhat less than the external diameter of insulation 14 so that portions 60 and 62, which lie mostly along the insulating second part 32 of housing 28, will be dilated resiliently and will grip the insulation 14 to establish a waterseal, to increase the dielectric strength of the creep path along the outer surface of insulation 14 between the upper end 46 and the terminal end 22 of the shield 16, and to provide a strong mechanical connection between the housing 28 and cable 10. A further portion 64 of bore 40 is located on the conductive first part 30 of the housing 28 and has an internal diameter somewhat less than the overall diameter of cable shield 16 so that portion 64 will be dilated resiliently and will grip the shield 16 to establish an electrical connection between the shield 16 and the first part 30 of the housing 28.

In order to facilitate the installation of housing 28 on cable 10, a lubricant 65, such as a silicone grease, is applied to the outer surface of the cable 10, and especially along the outer surface of the exposed length of insulation 14, to ease the insertion of the cable into the bore 40. Lubricant is also applied to the housing 28 within bore 40. Such measures have been employed in the past; however, their effectiveness has been impaired by the tendency for the lubricant to be wiped from the cable at the entrance to the bore, thereby reducing the amount of lubricant available along the length of the bore, with a concomitant increase in the frictional forces tending to resist the accomplishment of a completed assembly.

In order to alleviate the problem of wiping lubricant 65 from the surface of the cable 10 during the installation of housing 28, bore 40 is provided with an inlet passage 66 adjacent the lower open end 68, the inlet passage 66 having a radially outwardly flared configuration which permits the lubricant 65 on the cable to enter the bore 40 during installation. Inlet passage 66 is flared radially outwardly in the direction extending from portion 62 of bore 40 toward open end 68 and generally includes a first portion 70, and a second portion 72 which essentially coincides with bore portion 64. First portion 70 tapers downwardly from a maximum diameter at open end 68 to a prescribed diameter $D_1$ spaced axially from open end 68, while second portion 72 tapers downwardly from diameter $D_1$ to a prescribed diameter $D_2$, located adjacent insulation-gripping portion 62. The taper of first portion 70 is steeper than the taper of second portion 72, as illustrated in FIG. 1, so that each portion 70 and 72 of inlet passage 66 will perform its specified function as follows.

The maximum diameter at open end 68 is substantially larger than the largest overall diameter of cable 10 so that inlet passage 66 will accept not only cable 10, but will accept lubricant 65 on the cable with minimal wiping away of the lubricant. The relatively steeper taper of first portion 70 will tend to funnel the lubricant toward the second portion 72, while reducing the internal diameter of inlet passage 66 to diameter $D_1$.

The diameters $D_1$ and $D_2$ both are smaller than the diameter of outside surface 18 of a cable 10 of smallest overall diameter. Preferably, diameter $D_2$ is equal to the inside diameter of insulation-gripping portion 62 of bore 40. The relative dimensions of second portion 72 and a cable 10 having a diameter within the predetermined range, coupled with the substantial wall thickness of the housing 28 at the second portion 72, assures that second portion 72 will be dilated resiliently and will grip the shield 16 to establish the appropriate electrical connection between the shield 16 and the first part 30 of housing 28. The axial spacing between diameters $D_1$ and $D_2$ is chosen so that the terminal end 22 of shield 16 can be placed at any location within the range of axial locations delineated by the longitudinal spacing between diameters $D_1$ and $D_2$ while still attaining the appropriate firm grip between the first part 30 of housing 28 and the shield 16. In this manner, the more shallow taper of second portion 72 of inlet passage 66 serves to compensate for variations in the location of terminal end 22 of shield 16 relative to the terminal end 24 of insulation 14 and the terminal end 26 of conductor 12. At the same time, the shallow taper of second portion 72 of inlet passage 66 tends to reduce the volume of any gap 74 formed between the first part 30 of housing 28 and the insulation 14 at the terminal end 22 of the shield 16, while still permitting some tolerance in the axial location of the terminal end 22 relative to the housing 28.

As stated above, diameter $D_2$ preferably is equal to the inside diameter of insulation-gripping portion 62 of bore 40. In addition, second portion 72 is located wholly within first part 30 of housing 28 and second diameter $D_2$ is spaced longitudinally from boundary 34, in the direction toward open end 68, so that insulation-gripping portion 62 extends into first part 30. Thus, any gap 74 will be surrounded by the conductive material of first part 30. Furthermore, boundary 34 will be placed at a location where no gap will exist between the housing 28 and insulation 14 of the cable.

The relatively steeper taper of first portion 70 and shallower taper of second portion 72 of inlet passage 66 preferably are attained by a flared configuration which follows an exponentially curved surface. However, the exponentially curved surface can be approximated by conical surfaces intersecting at curved junctures. Thus, the flare of inlet surface 66 preferably follows a configuration which at least approximates an exponentially curved surface.

It is noted that bore 40 includes two insulation-gripping portions 60 and 62 spaced apart axially, with a further bore portion 76 placed between first and second bore portions 60 and 62. Further bore portion 76 has an internal diameter greater than that of portions 60 and 62, and preferably greater than that of insulation 14, and serves as a relief portion for reducing the frictional forces along the insulation 14 during installation. Since portions 60 and 62 themselves establish frictional forces sufficient to attain the desired waterseals and mechanical retention forces, excessive frictional forces can be relieved to reduce the forces required for installation.

Figure 3:
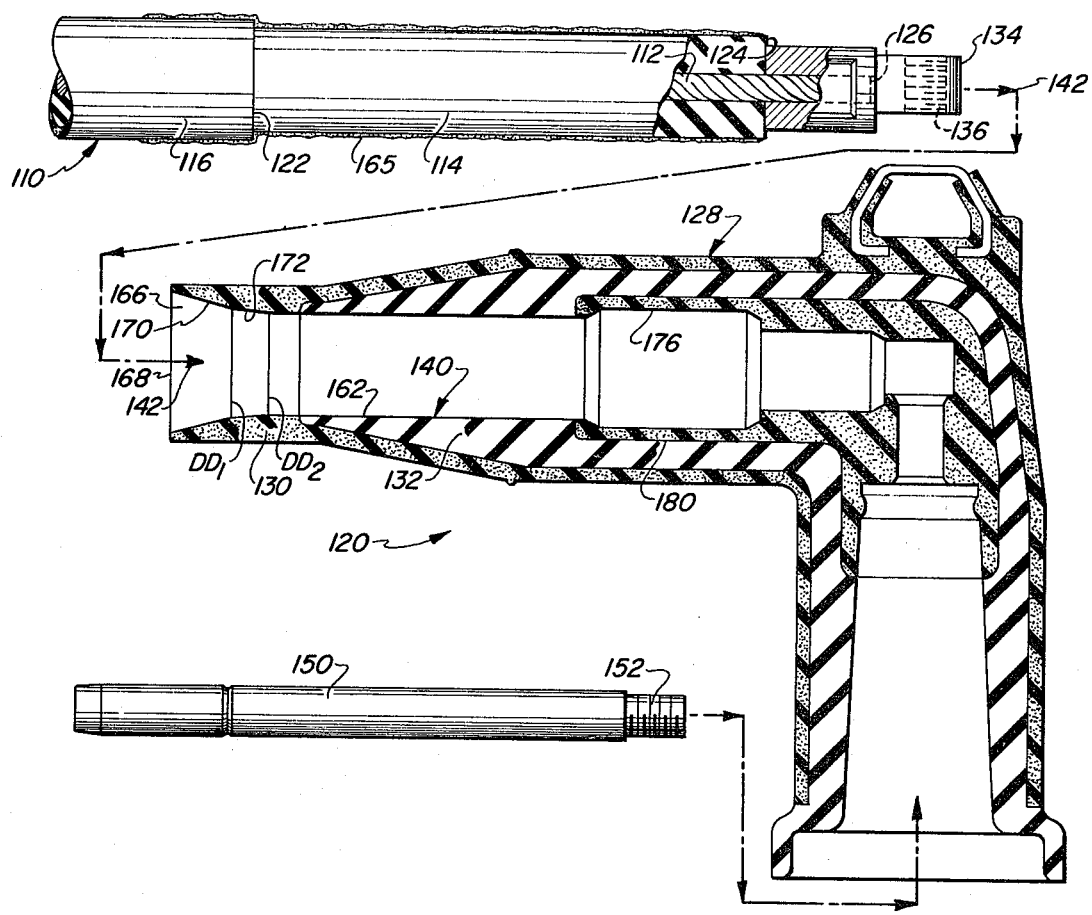
FIG. 3 is an exploded, longitudinal cross-sectional view of a connector elbow constructed in accordance with the invention and about to be installed upon a cable terminus.
Figure 4:
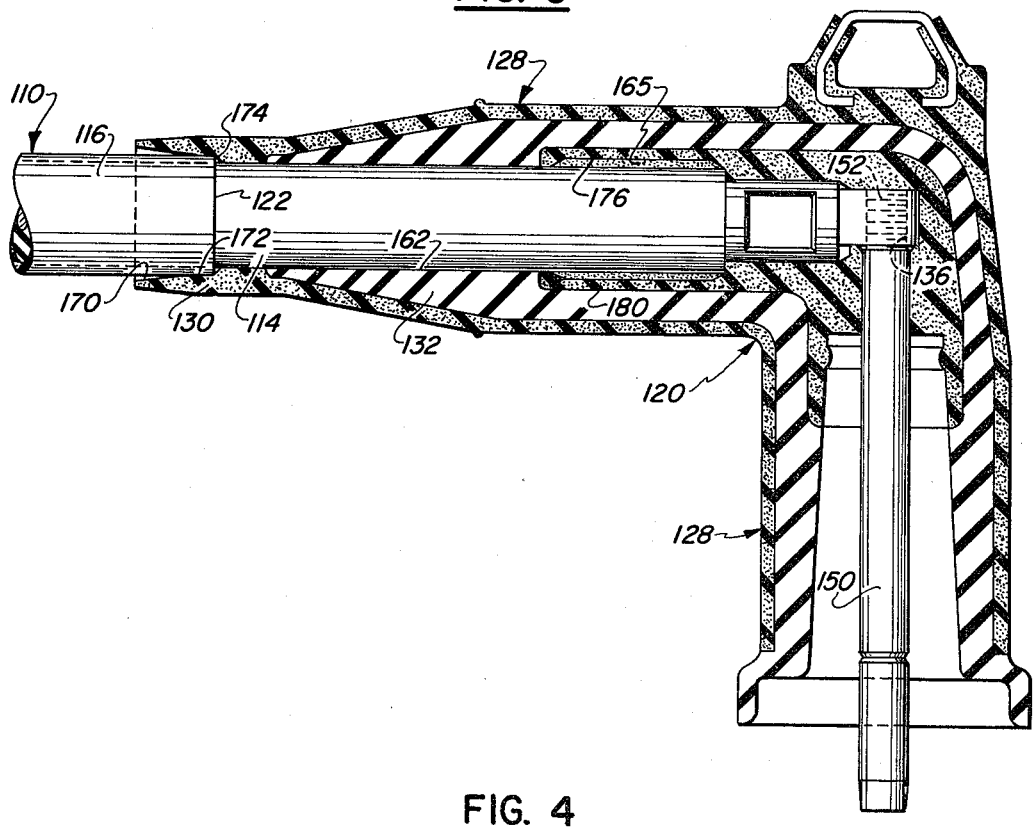
FIG. 4 is a longitudinal cross-sectional view of the connector elbow of FIG. 3, assembled on the cable terminus.

Turning now to FIGS. 3 and 4, another electrical cable 110 is similar to cable 10 in that cable 110 has a central conductor 112 surrounded by insulation 114 which, in turn, is surrounded by a conductive shield 116. Another cable accessory, constructed in accordance with the invention, is shown in the form of an electrical connector elbow 120 which is to be installed at the terminus of cable 110. The shield 116 of cable 110 has been terminated at 122 to bare a length of the insulation 114, and the insulation 114 has been terminated at 124 to bare a length of the conductor 112 which terminates at 126.

Elbow 120 includes a sleeve-like composite housing 128 having a first part 130 of conductive elastomeric material molded integral with a second part 132 of insulating elastomeric material. A metallic fitting 134 has been crimped onto the exposed length of conductor 112 and carries a threaded aperture 136. The terminus of cable 110, with fitting 134 affixed thereto, is inserted into an opening in the form of bore 140, which extends axially along the housing 128, in the direction indicated by the arrowheads 142 in FIG. 3. The cable 110 is advanced within the housing 128 until the housing 128 is properly located on the cable terminus, as illustrated in FIG. 4. When the housing 128 is so located upon the cable 110, an electrical connector pin 150 is affixed to fitting 134 by threading a threaded end 152 into threaded aperture 136 to complete the installation.

The relative dimensions of bore 140 and cable 110 are such that portions of the bore will be resiliently dilated to grip corresponding portions of the cable with sufficient gripping force to provide the appropriate waterseal, dielectric integrity, electrical connection and mechanical integrity. Accordingly, portion 162 has an internal diameter which is somewhat less than the external diameter of insulation 114 so that portion 162 will grip the insulation 114 to establish a waterseal, to increase the dielectric strength of the creep path along the outer surface of the insulation 114 between the terminal end 122 of the shield 116 and the fitting 134, and to provide a strong mechanical connection between the housing 128 and cable 110.

As described above in connection with terminator 20, elbow 120 is installed by using a lubricant 165 to ease the installation of housing 128 upon the terminus of cable 110. In order to alleviate the problem of wiping the lubricant 165 from the surface of cable 110 during the installation, bore 140 is provided with an inlet passage 166 at open end 168 and the inlet passage has a flared configuration including a first portion 170 and a second portion 172. First portion 170 tapers from a maximum diameter at open end 168 down to a smaller diameter $DD_1$ while second portion 172 tapers down from diameter $DD_1$ to a still smaller diameter $DD_2$. The taper of first portion 170 is steeper than the taper of second portion 172 and the diameters $DD_1$ and $DD_2$ are spaced apart axially so that each portion 170 and 172 will perform the functions described above in connection with terminator 20.

As in the earlier-described embodiment, diameter $DD_2$ preferably is equal to the inside diameter of insulation-gripping portion 162 of bore 140 and second portion 172 is located wholly within first part 130 of housing 128, with second diameter $DD_2$ being spaced axially from the boundary between first and second parts 130 and 132, toward open end 168, so that insulation-gripping portion 162 extends into first part 130. Thus, any gap 174 will be surrounded by the conductive material of first part 130.

The relatively steeper taper of first portion 170 and the shallower taper of second portion 172 of inlet passage 166 preferably are attained by a flared configuration which at least approximates an exponentially curved surface.

Bore 140 includes a further bore portion 176 located beyond the insulation-gripping portion 162 and having an internal diameter greater than that of insulation-gripping portion 162 and preferably greater than that of insulation 114. Further bore portion 176 serves as a relief portion for reducing the frictional forces along the insulation 114 during installation. A further part 180 of composite housing 128 is molded integral with first part 130 and is constructed of a conductive elastomer. Further part 180 extends circumferentially around and radially outside of bore portion 176 to reduce electrical stresses in the vicinity of the bore portion 176.

It is to be understood that the above detailed description of embodiments of the invention are provided by way of example only. Various details of design and construction may be modified without departing from the true spirit and scope of the invention as set forth in the appended claims.

The embodiments of the invention in which an exclusive property or privilege is claimed are defined as follows:

1. In a cable accessory to be installed at the terminus of an electrically shielded cable by using a lubricant to ease the installation, the cable having an outside diameter falling within a predetermined range between a smallest diameter and a largest diameter, the cable including a conductor, insulation surrounding the conductor, and a conductive shield surrounding the insulation, the cable having a portion of the shield removed to expose the insulation thereof beyond a terminal region of the shield, and having a portion of the insulation removed to expose the conductor beyond a terminal region of the insulation, the terminal region of the exposed insulation being positioned between a terminal region of the exposed conductor and the terminal region of the exposed shield:

a sleeve-like member of essentially solid elastomeric material having an open end through which the terminus of the cable is to be passed and an axially-extending opening for receiving the cable terminus, the opening including a resiliently dilatable insulation-gripping portion for firmly gripping the insulation and an inlet passage extending between the insulation-gripping portion and the open end of the sleeve-like member;

the inlet passage being flared radially outwardly in the direction from the insulation-gripping portion toward the open end such that the inside diameter of the inlet passage at the open end is substantially larger than the largest diameter of said predetermined range, the inlet passage including a first axially-extending portion tapering downwardly from a maximum diameter at the open end to a first prescribed diameter spaced axially from the open end, and a second axially-extending portion tapering downwardly from the first prescribed diameter to a second prescribed diameter located adjacent the insulation-gripping portion of the opening;

the sleeve-like member having a substantial wall thickness at the second axially-extending portion of the inlet passage, the substantial wall thickness being provided by the solid elastomeric structure of the sleeve-like member;

the inside diameter of the inlet passage at the open end being large enough to permit the lubricant on the cable to enter the opening during installation, and the first and second prescribed diameters being such that the relative dimensions of the second axially-extending portion of the inlet passage and a cable having an outside diameter within said predetermined range, together with the substantial wall thickness provided by the solid elastomeric structure of the sleeve-like member at the second axially-extending portion, will assure that the surrounding conductive shield of the cable will be gripped firmly at a location along the second axially-extending portion of the inlet passage, the first prescribed diameter being spaced axially from the second prescribed diameter so as to enable the terminal region of the shield to be located axially anywhere thereinbetween, the second axially-extending portion being adapted, by virtue of said relative dimensions and said substantial wall thickness, to grip radially the terminal region of the shield so as to substantially reduce any voids between the inlet passage and the terminal region of the shield while compensating for a variation in the axial location of the terminal region of the shield relative to the terminal region of the insulation and the terminal region of the conductor.

2. The invention of claim 1 wherein the first prescribed diameter and the second prescribed diameter are each smaller than the smallest diameter of said predetermined range.

3. The invention of claim 2 wherein the taper of the first axially-extending portion of the inlet passage is steeper than the taper of the second axially-extending portion of the inlet passage.

4. The invention of claim 3 wherein the flare of the inlet passage follows a configuration which at least approximates an exponentially curved surface.

5. The invention of claim 1, 2, 3 or 4 wherein the second prescribed diameter equals the diameter of the insulation-gripping portion of the opening.

6. The invention of claim 1, 2, 3 or 4 wherein the opening includes:

a further resiliently dilatable insulation-gripping portion for firmly gripping the insulation, the further insulation-gripping portion being spaced axially from the first said insulation-gripping portion; and a relief portion extending axially between the insulation-gripping portions and having a diameter greater than the diameter of the insulation-gripping portions for reducing the frictional forces along the insulation during installation.

7. The invention of claim 6 wherein the second prescribed diameter equals the diameter of at least the first said insulation-gripping portion of the opening.

8. The invention of claim 1, 2, 3 or 4 wherein the opening includes a relief portion located beyond the insulation-gripping portion in the direction away from the open end, the relief portion having a diameter greater than the insulation-gripping portion for reducing the frictional forces along the insulation during installation.

9. The invention of claim 1 wherein:

the sleeve-like member of elastomeric material is a composite member having a first part of conductive elastomeric material and a second part of insulating elastomeric material; and the inlet passage is located entirely within the first part of the member.

10. The invention of claim 9 wherein at least a part of the insulation-gripping portion of the opening is located within the first part of the member.

11. The invention of claim 10 wherein the first prescribed diameter and the second prescribed diameter are each smaller than the smallest diameter of said predetermined range.

12. The invention of claim 11 wherein the taper of the first insulation-gripping portion of the inlet passage is steeper than the taper of the second insulation-gripping portion of the inlet passage.

13. The invention of claim 12 wherein the flare of the inlet passage follows a configuration which at least approximates an exponentially curved surface.

14. The invention of claim 10, 11, 12 or 13 wherein the second prescribed diameter equals the diameter of the insulation-gripping portion of the opening.

15. The invention of claim 10, 11, 12 or 13 wherein the opening includes:
   a further resiliently dilatable insulation-gripping portion for firmly gripping the insulation, the further insulation-gripping portion being spaced axially from the first said insulation-gripping portion; and
   a relief portion extending axially between the insulation-gripping portions and having a diameter greater than the diameter of the insulation-gripping portions for reducing the frictional forces along the insulation during installation.

16. The invention of claim 15 wherein the second prescribed diameter equals the diameter of at least the first said insulation-gripping portion of the opening.

17. The invention of claim 10, 11, 12 or 13 wherein the opening includes a relief portion located beyond the insulation-gripping portion in the direction away from the open end, the relief portion having a diameter greater than the insulation-gripping portion for reducing the frictional forces along the insulation during installation.

18. The invention of claim 17 wherein the sleeve-like member of elastomeric material includes a third part of conductive elastomeric material extending circumferentially around and radially outside of the relief portion of the opening.

* * * * *